(12) United States Patent
Stewart et al.

(10) Patent No.: US 7,317,928 B2
(45) Date of Patent: Jan. 8, 2008

(54) SYSTEM AND METHOD FOR EXPOSING INSTANT MESSENGER PRESENCE INFORMATION ON A MOBILE DEVICE

(75) Inventors: David Edward Stewart, Seattle, WA (US); Steven Andrew Cover, Redmond, WA (US); William Scott Stauber, Seattle, WA (US); Garrett Vargas, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 10/811,232

(22) Filed: Mar. 26, 2004

(65) Prior Publication Data

US 2005/0216563 A1   Sep. 29, 2005

(51) Int. Cl.
*H04Q 7/20* (2006.01)

(52) U.S. Cl. .................. 455/466; 455/404.2; 455/412

(58) Field of Classification Search ............... 455/466, 455/404.2, 412
See application file for complete search history.

(56) References Cited

U.S. PATENT DOCUMENTS

| 6,990,353 | B2* | 1/2006 | Florkey et al. | ............. 455/519 |
| 2003/0083046 | A1* | 5/2003 | Mathis | ........................ 455/412 |
| 2004/0248597 | A1* | 12/2004 | Mathis | ........................ 455/466 |

* cited by examiner

*Primary Examiner*—Joseph Feild
*Assistant Examiner*—S. Smith
(74) *Attorney, Agent, or Firm*—Merchant & Gould P.C.

(57) ABSTRACT

A cross-process layer is generally directed to exposing instant messenger (IM) presence information on a mobile device. An application program interface (API) is provided that allows clients to retrieve IM presence information for display regardless of the IM service provider providing the IM presence information. The IM service providers therefore interoperate with any application on the mobile device and enables any application to show presence for any IM contact.

21 Claims, 7 Drawing Sheets

SYSTEM AND METHOD FOR EXPOSING INSTANT MESSENGER PRESENCE INFORMATION ON A MOBILE DEVICE

BACKGROUND OF THE INVENTION

An Instant Messenger (IM) program provides a method for user to send instant messages to other IM users on the Internet or on a network. IM is a type of communications service that enables a user to create a kind of private chat room with another individual in order to communicate in real time over the Internet. IM is analogous to a telephone conversation, but uses text-based, not voice-based, communication. Typically, the instant messaging system alerts a user whenever somebody on the user's private list is online. The user may then initiate a chat session with that particular individual.

With the instant messaging program a user may perform any number of functions that include viewing the user's contacts who are online, sending an instant message, calling a contact's computer, sending a contact a file, having an instant message conversation with a group of friends, inviting someone to play a game, being notified of new e-mail messages from an e-mail account, and other activities. However, in order to receive the presence information provided by the IM program, generally a user has the IM application currently running and the IM application being viewed by the user. What is needed is a method for providing the presence information through other means.

SUMMARY OF THE INVENTION

The present invention provides a cross-process layer for exposing instant messenger (IM) presence information on a mobile device. An application program interface (API) is provided that allows clients to retrieve IM presence information for display regardless of the IM service provider providing the IM presence information. The IM service providers therefore interoperate with any application on the mobile device and enables any application to show presence for any IM contact. The present invention allows applications to show the IM presence information without the user actually having to view the user interface provided by the IM application itself. The present invention therefore provides a way to conserve screen real estate, which is a premium on mobile devices, for other client applications.

Client applications may include readily identifiable contacts for which IM presence information is desired. For example, IM presence information may be provided for recent senders of e-mails within e-mail client application. The client sends an IM server a notification requesting the IM presence information for one of the contacts (i.e., sender of an e-mail). The IM server searches the "buddy list" within the IM application, or a list of people that the user sends instant messages to, for a match with the contact. The IM server may also search a contacts application, that includes the user's contact list, for matches to the sender of the e-mail. The contacts application may include an entry that associates the sender of the e-mail with an entry of the buddy list. Once the sender of the e-mail is identified as a member of the buddy list, the IM presence information is forwarded to the client for display.

Alternatively, the client may just request general IM presence information. The client requests the IM presence information for the entries of the buddy list in the IM application, and displays the entries that are currently online and available for an instant messaging session.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
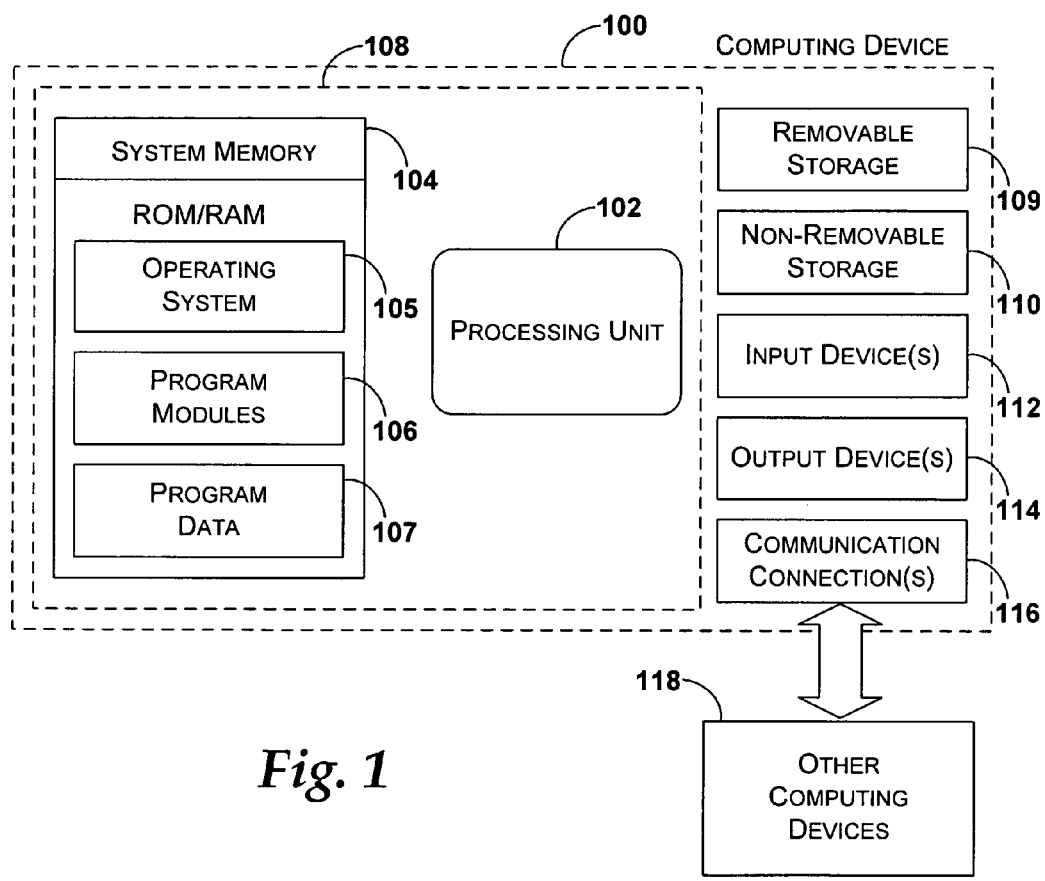
FIG. 1 illustrates an exemplary computing device that may be used in one exemplary embodiment of the present invention.

FIG. 1 shows an exemplary computing device that may be included in system 100 for implementing the invention. Computing device 100 illustrates a general operating environment that may apply to the present invention. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, the system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, stylus, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
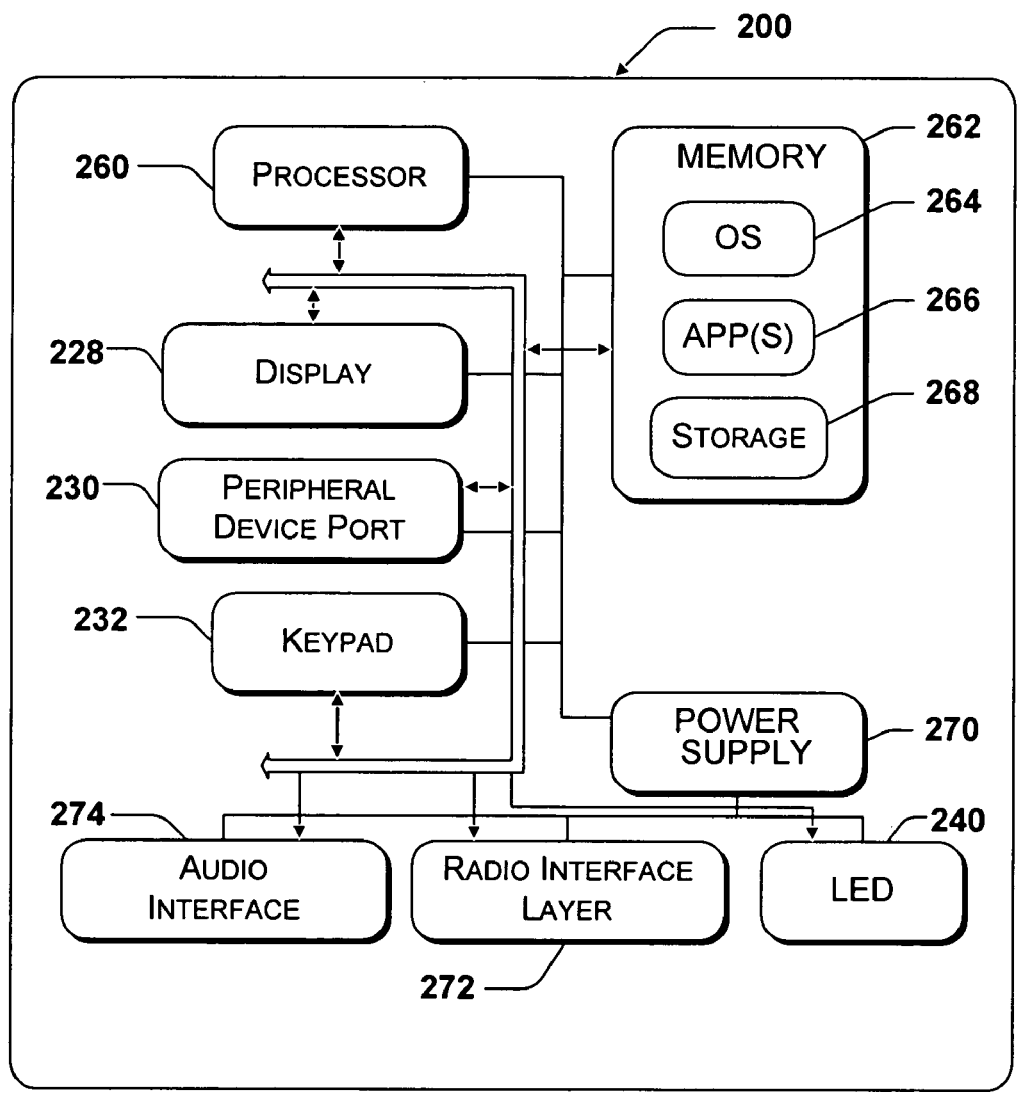
FIG. 2 illustrates an exemplary mobile device that may be used in one exemplary embodiment of the present invention.

FIG. 2 shows an alternative operating environment for a mobile device substantially for use in the present invention. In one embodiment of the present invention, mobile device 200 is integrated with a computing device, such as an integrated personal digital assistant (PDA) and wireless phone.

In this embodiment, mobile device 200 has a processor 260, a memory 262, a display 228, and a keypad 232. Memory 262 generally includes both volatile memory (e.g., RAM) and non-volatile memory (e.g., ROM, Flash Memory, or the like). Mobile device 200 includes an operating system 264, which is resident in memory 262 and executes on processor 260. Keypad 232 may be a push button numeric dialing pad (such as on a typical telephone), a multi-key keyboard (such as a conventional keyboard), or may be not be included in the mobile device in deference to a touch screen or stylus. Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile device 200 also includes non-volatile storage 268 within the memory 262. Non-volatile storage 268 may be used to store persistent information which should not be lost if mobile device 200 is powered down. The applications 266 may use and store information in storage 268, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 268 synchronized with corresponding information stored at the host computer.

Mobile device 200 has a power supply 270, which may be implemented as one or more batteries. Power supply 270 might further include an external power source, such as an AC adapter or a powered docking cradle that supplements or recharges the batteries.

Mobile device 200 is also shown with two types of external notification mechanisms: an LED 240 and an audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile device 200 also includes a radio 272 that performs the function of transmitting and receiving radio frequency communications. Radio 272 facilitates wireless connectivity between the mobile device 200 and the outside world, via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 200 to communicate with other computing devices, such as over a network. The radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Exposing Instant Message Presence Information

Figure 3:
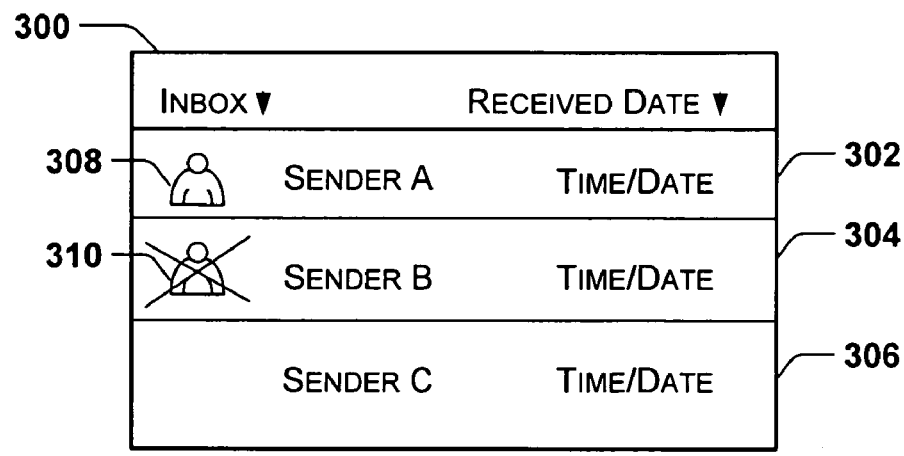
FIG. 3 illustrates exemplary user interface outputs for an inbox and a today screen that include instant message presence information in accordance with the present invention.
Figure 3:
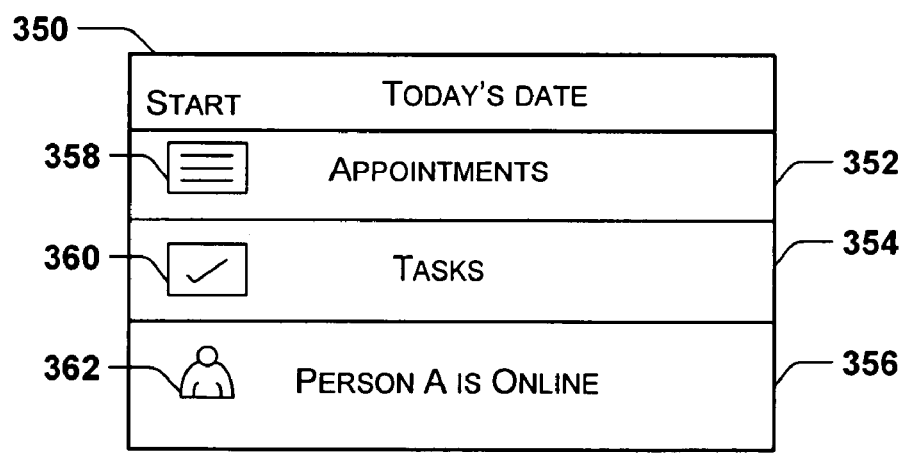

FIG. 3 illustrates exemplary user interface outputs for an inbox and a today screen that include instant message presence information in accordance with the present invention. Inbox 300 includes entries 302, 304, and 306. Each entry shows the sender of the e-mail to the user (e.g., sender A, sender B, sender C) and the time and date of the e-mail delivery. As is known with inbox applications such inbox 300 shown, other fields may also be included (e.g., subject, etc.) that provided further information regarding the mail sent or received.

In accordance with the present invention, each entry (e.g., 302) may also include an icon (e.g., 308, 310) that provides an indication of a relationship between the sender and the recipient as well as the IM presence for the sender of the e-mail. For example, sender A is has associated icon 302. First, icon 302 signifies that sender A is a "buddy" of the user. Stated differently, sender A is included in a list of individuals or groups to which the user sends or receives IM messages, also called a "buddy list." The buddy list is described in greater detail below with relation to FIG. 4.

Secondly, icon 302 signifies that sender A is "online". "Online" refers to sender A being currently able to hold an IM session with the user. In contrast, icon 304 shows that sender B is a buddy of the user, but the "X" through icon 304 indicates that sender B is not online. Furthermore, sender C, by not having an associated icon, is neither online nor included within the buddy list of the user.

Today screen 350 is similar to inbox 300 while providing the user with other information than received or sent e-mails. Today screen 350 includes different portions of an application that a user may access to perform various operations. For example, appointment entry 352 may be selected to view a user's appointments, or tasks entry 354 may be selected to view a user's tasks. In the example shown, each entry has an associated icon (e.g., 358 and 360), but in other embodiments may have different or additional information associated with each entry.

In accordance with the present invention, today screen 350 also includes an entry, or entries that provide IM presence information. For example, entry 356 is included that notifies the user that "person A is online". Again, entry 356 has an associated icon 362, but in other embodiments may include different icons or none.

With either inbox 300 or today screen 350, a user may initiate an IM session with a person or group indicated as being online by merely selecting the associated icon or the entry. Other methods for initiating an IM session through these interfaces may also be used.

Figure 4:
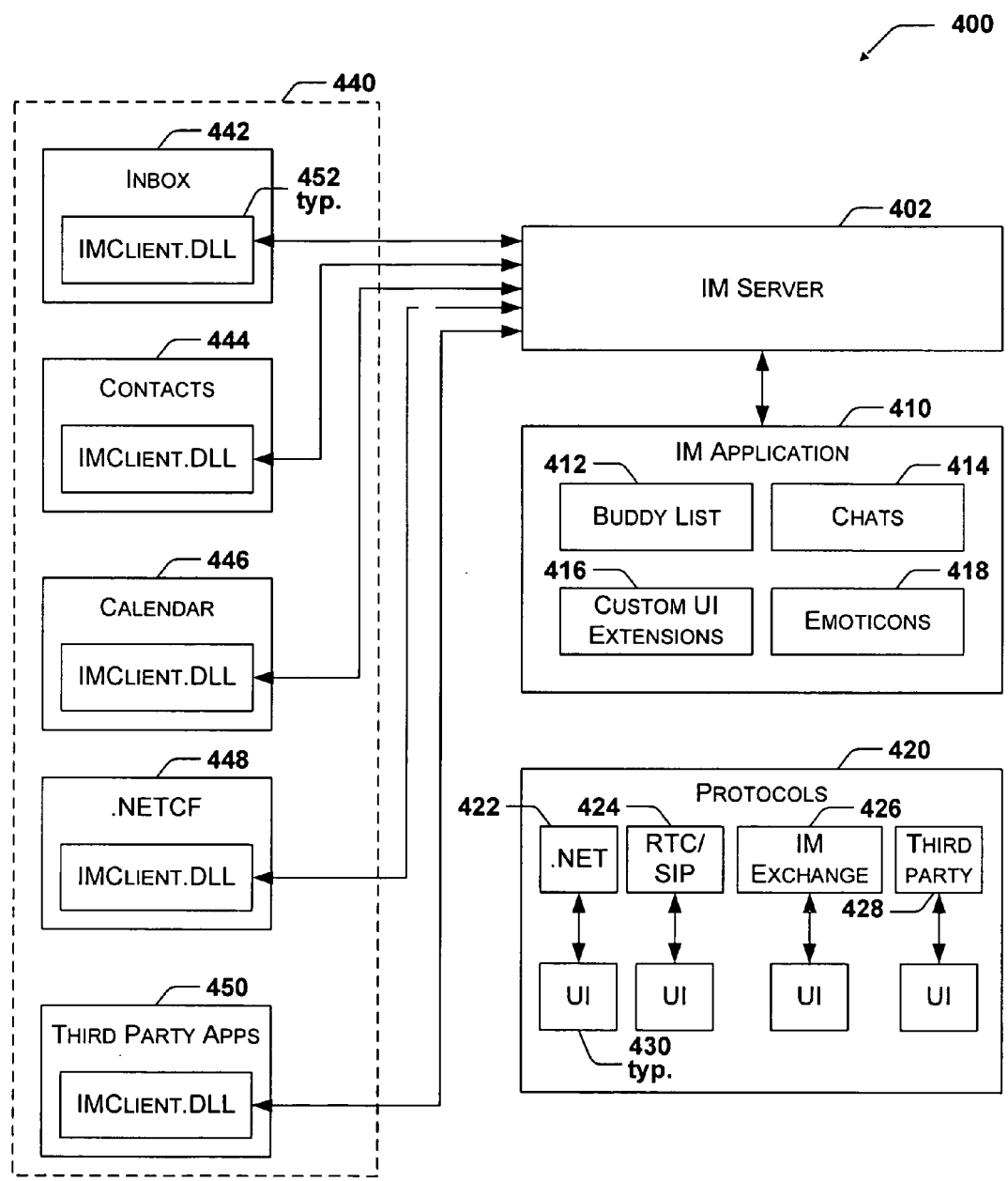
FIG. 4 illustrates an exemplary block diagram for a system that provides instant message presence information on other applications in accordance with the present invention.

FIG. 4 illustrates an exemplary block diagram for a system that provides instant message presence information on other applications in accordance with the present invention. System 400 includes IM server 402, IM application 410, protocols 420, and client applications 440. IM application 410 includes buddy list 412, chats 414, custom UI extensions 416, and emoticons 418. Protocols 420 includes one or more of the protocols NET Messenger Service 422, RTC/SIP 424, IM exchange 426, and possibly third party protocols 428. Each protocol has an associated user interface (UI) 430. Client applications 440 includes inbox 442, contacts 444, calendar 446, and third party applications written with the NET Compact Framework 448 or native code 450. Each client application also includes an IMclient.dll, or IM client dynamic link library 452.

Each client application (e.g., 442) is populated with instructions for providing IM presence information using IMclient.dll 452. The IM presence information is provided to each client application (e.g., 442) through IM server 402. IM application 410 uses protocol information according the protocol of the particular user's IM application to present the IM presence information in the other applications.

Figure 5:
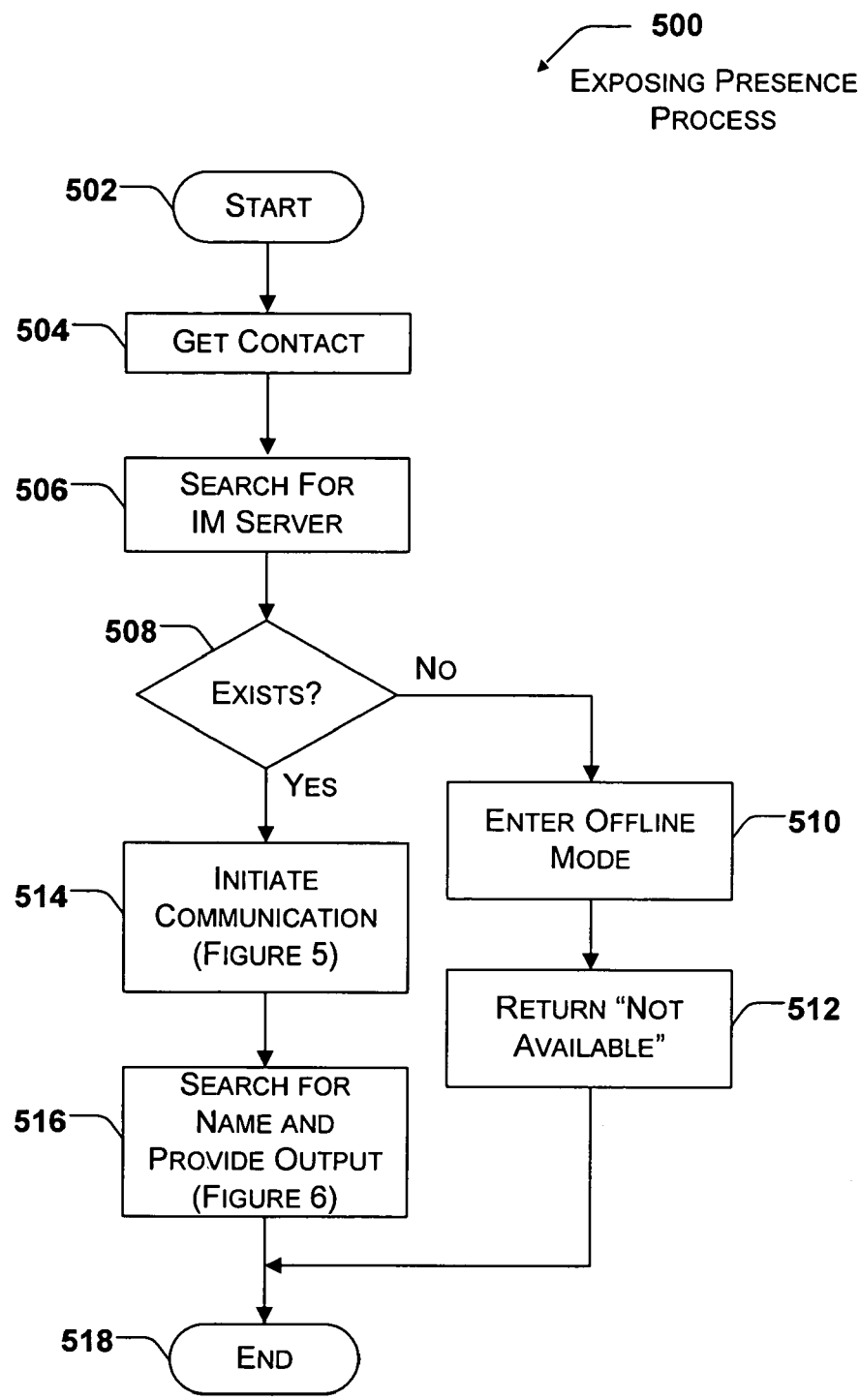
FIG. 5 illustrates a logical flow diagram of a process for providing instant message presence information on other applications in accordance with the present invention.

FIG. 5 illustrates a logical flow diagram of a process for providing instant message presence information on other applications in accordance with the present invention. Process 500 starts at block 502 where a user is logged onto an IM service and the IMClient.dll is loaded into a selected client application. Processing continues at block 504.

At block 504, the contact for which the client desires to have the IM presence information is retrieved. The contact is identified by a name or other identifier that differentiates the contact from the other possible contacts. For example, the client application may be an e-mail inbox (See FIG. 3). The client can therefore be identified according to its string name or e-mail address. Once the contact is retrieved, processing continues at block 506.

At block 506, the IM server is searched for by the client in order to initiate communication for the process of retrieving the IM presence information for the identified contact. Processing continues at block 508.

At block 508, a determination is made at the conclusion of the search for the IM client as to whether the IM server exists. The IM server may not exist on the mobile device on which the client application is loaded, or a communication error may exist between the client and the IM server that prevents transmission of the IM presence information. If a determination is made that the IM server does not exist or cannot be reached, processing moves to block 510. However, if the client is successful in locating the IM server, processing advances to block 514.

At block 510, the client enters an "offline mode" with respect to retrieving the IM presence information. The "offline mode" refers to the situation when the client application is unable to retrieve the IM presence information. The algorithm for entering the offline mode is provided in the IMClient.dll file referred to by the client application. Once the client enters the offline mode, processing continues at block 512.

At block 512, an error message is returned to the client that indicates that that the IM server is unavailable. Since the process for populating the client with the IM presence information can no longer proceed, once the error message is returned processing advances to block 518, where process 500 ends.

In contrast, if the IM server is available, communication is initiated between the IM server and the client at block 514. An exemplary process for initiating the communication is described in greater detail in the discussion of FIG. 6 below. Once communication has been initiated, processing continues at block 516.

At block 516, the IM server searches for the name of the contact for which the IM presence information is requested. If the name is found, the client application may publish the IM presence information to the user within the user interface associated with the client application. An exemplary process for searching for the name of the contact and providing an output of the IM presence information is described in greater detail in the discussion of FIG. 7 below. Once an output is provided to the client regarding the IM presence information, processing proceeds to block 518, where process 500 ends.

In another embodiment, steps 504 and 506 may not be necessary for a particular client application. The client application may desire to retrieve the IM presence information without a relation to a particular contact. For example, a today screen may include all the current contacts identified through the "buddy list" of the IM application as being currently online (See FIG. 3). In this case, a contact is not first identified, and the IM presence information retrieved for the client application is general rather than specific for an identified contact.

Figure 6:
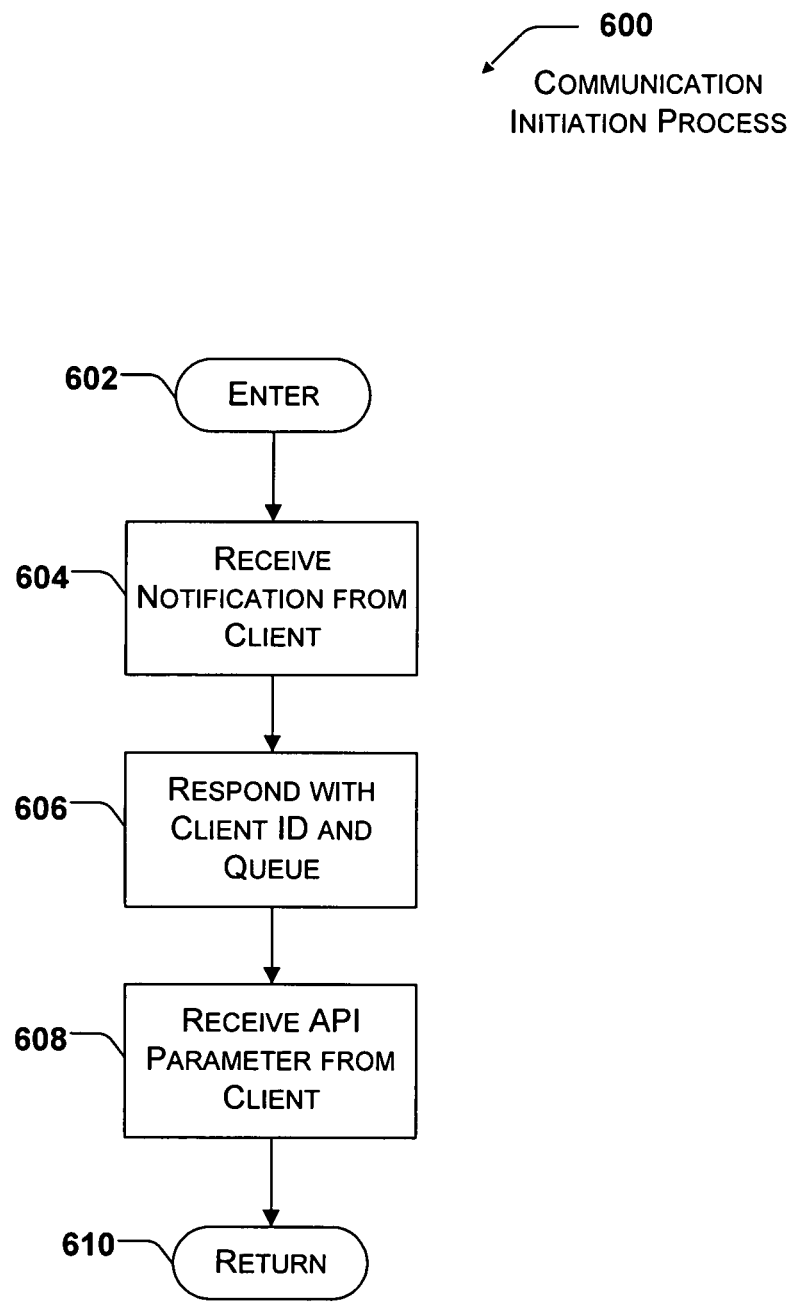
FIG. 6 illustrates a logical flow diagram of a process for initiating communication between an IM server and client in accordance with the present invention.

FIG. 6 illustrates a logical flow diagram of a process for initiating communication between an IM server and client in accordance with the present invention. Process 600 enters at block 602 when process 500 enter block 514 as shown in FIG. 5. Processing continues at block 604.

At block 604, the IM server receives a notification from the client application that corresponds to a request from the client application for the IM presence information. The notification enters a message queue that includes the messages from that particular client. The IM server includes a message queue for each client to which it is providing IM presence information. The IM server also provides a unique identifier for the client. After the notification message is provide to the IM server and the server processes the message, processing proceeds to block 606.

At block 606, the IM server responds to the client with the unique identifier provided to the client and the queue generated for the client. Providing the queue to the client synchronizes the client process with the process of the IM server. Once the client receives and stores the unique identifier and queue, processing continues at block 608.

At block 608, the IM server receives an API (application program interface) parameter from the client that instructs the IM server to search for the name of the contact. The API parameter and future API parameters, include the unique identifier that signifies from which client the IM server is receiving the call. There are a number of API calls that may be made once the communication of the IM presence information to the client is established. However, before the capabilities of instant messaging may be applied on the client application, a determination must be made whether any previously identified contacts are associated with the IM application. This determination is described in greater detail in the discussion of FIG. 7. Accordingly, once the API parameter initiating the search of the previously identified contact is sent to the IM server, processing proceeds to block 610, where processing returns to block 516 of FIG. 5.

Figure 7:
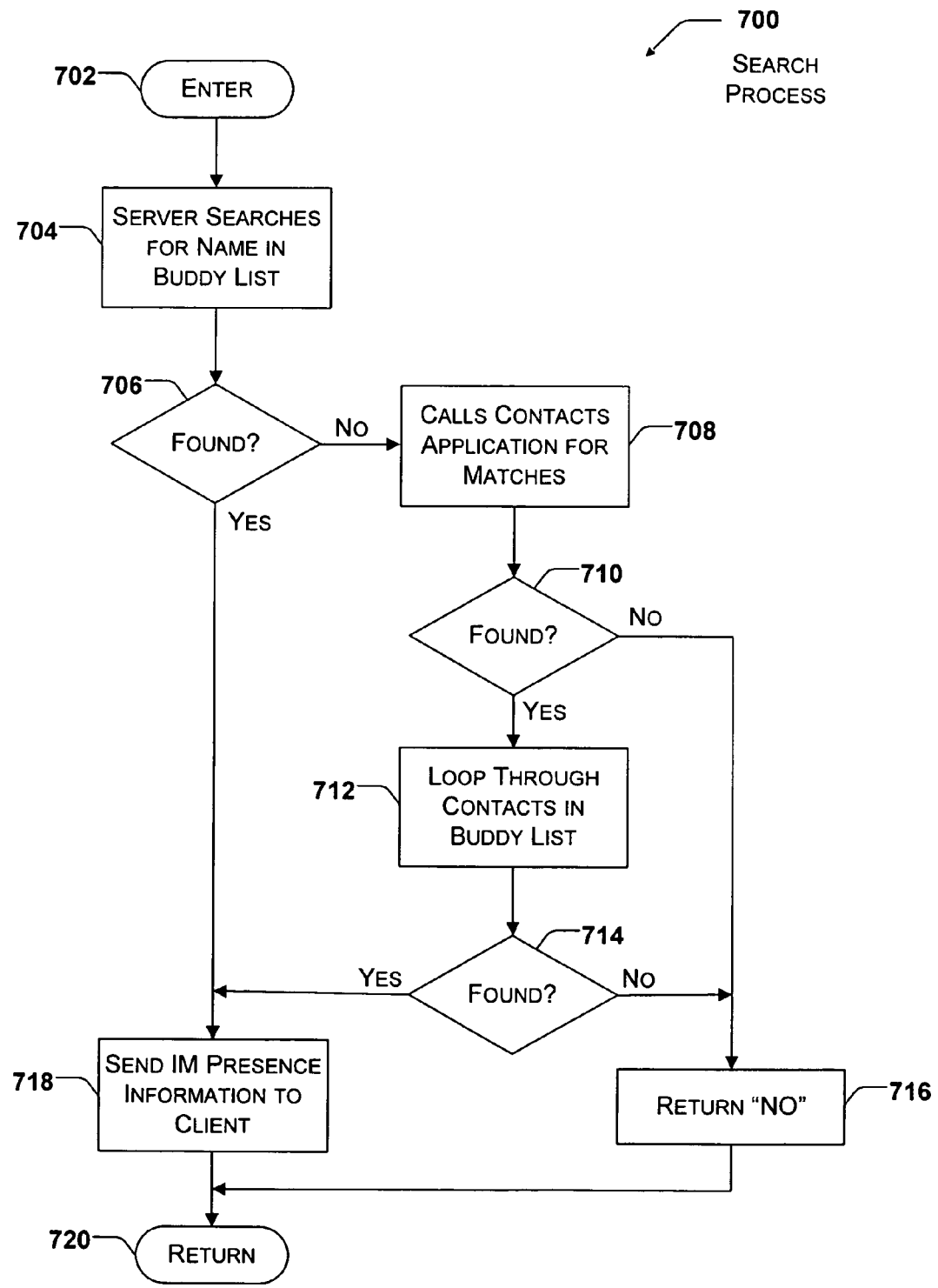
FIG. 7 illustrates a logical flow diagram of a process for searching for a name in response to a query by an IM server in accordance with the present invention.

FIG. 7 illustrates a logical flow diagram of a process for searching for a name in response to a query by an IM server in accordance with the present invention. Process 700 enters at block 702 when process 500 enter block 516 as shown in FIG. 5. Processing continues at block 704.

At block 704, the server searches for the name of the previously identified contact in the buddy list of the IM application. It may be that the person to which the contact applies uses the same e-mail address or alias for their instant messaging as they do in their e-mail program. In such cases, a match may be found for the contact if they are included in the buddy list of the IM application. As the IM server searches for the name in the buddy list, processing proceeds to decision block 706.

At decision block 706, a determination is made whether the name or identifier of the contact was found within the buddy list of the IM application. If the contact is found, processing advances to block 718. However, if the contact is not found, processing moves to block 708.

At block 708, the IM server call the contacts application to determine if any matches exists for the name or identifier of the contact within the contacts application. The contacts application refers to a client application that stores a list of contacts for a particular user. Each contact includes information about a particular person, such as their address, e-mail address, phone number, and other information that has been entered regarding that person. As the IM server searches for the name in the contacts application, processing proceeds to decision block 710.

At decision block 710, a determination is made whether the contact is found is within the contacts application. If the contact is not found within the contacts application, processing advances to block 716. However, if the contact is found listed within the contacts application, processing continues at block 712.

At block 712, the list of contacts in the contacts application is looped through for matches to the name or identifier of the previously identified contact. For example, the e-mail alias for the previously identified contact may be different from their instant messaging alias. However, both aliases are listed and related to the same person within the contacts application. By looping through the contacts application and buddy list, the IM server is able to relate the previously identified contact with an instant messaging buddy. The previously identified contact is related to a buddy list entry even though the buddy list and the client have different aliases for the contact. As the IM server loops through the contacts application and buddy list for matches, processing continues at decision block 714.

At decision block 714, a determination is made whether the previously identified contact was found in the buddy list by looping through the contacts application and buddy list for matches. If a match is found between the contacts application and the buddy list, processing moves to block 718. However, if no match is found between the contacts application and the buddy list, processing moves to block 716.

Processing reaches block 716 when no match is found for the previously identified contact among those contacts with related IM presence information. In this case, a message (e.g., NO) is returned to the client that indicates that the IM presence information for the previously identified contact was not found. Accordingly, no IM presence information is published for the previously identified contact by the client, and processing moves to block 720 where processing returns to block 518 of FIG. 5.

In contrast, processing reaches block 718 when a match is found for the previously identified contact among the contacts with related IM presence information. In this case, the server sends the IM presence information to the client in response to the specific API calls provided to the server by the client. The IM presence information is called for and provided in a format for presentation by that particular client. In addition, the IM presence information is dynamic, changing as the contact information related to the buddy list or client application changes. Processing then proceeds to block 720, where processing returns to block 518 of FIG. 5.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for providing Instant Message (IM) presence information through a client application rather than through a client IM application on a mobile device, comprising:
    receiving a request from the client application through an Application Programming Interface (API) call made by the client application for the IM presence information; wherein the client application is not configured as a client IM application;
    initiating communication with the client application in response to the request from the client application;
    searching an IM application for the IM presence information requested; and
    forwarding the IM presence information to the client application when the IM presence information is located, such that the IM presence information is integrated with the client application and, otherwise when the IM presence information is not located, forwarding an indication that the IM presence information is not located to the client application.

2. The computer-implemented method of claim 1, wherein receiving a request from the client application further comprises receiving a request for a previously identified contact that is associated with the client application.

3. The computer-implemented method of claim 2, wherein searching the IM application further comprises searching a buddy list associated with the IM application for the previously identified contact.

4. The computer-implemented method of claim 2, wherein searching the IM application further comprises searching a contacts application for an entry corresponding to the previously identified contact, wherein the entry of the contacts application has a first parameter that marches a second parameter within an entry of a buddy list associated with the IM application.

5. The computer-implemented method of claim 1, wherein initiating communication further comprises providing the client application with a unique identifier that uniquely identifies the client application.

6. The computer-implemented method of claim 1, wherein initiating communication further comprises generating a message queue and providing the client application a copy of the queue, such that communication with the client application is synchronized.

7. The computer-implemented method of claim 1, wherein integrating the IM presence information with the client application further comprises publishing the IM presence information in a user interface associated with the client application.

8. A system for providing Instant Message (IM) presence information through a client application on a mobile device, comprising:
   an IM application, wherein the IM application includes a buddy list;
   an IM server that is arranged to:
      receive a request from the client application for the IM presence information through an application program interface (API) call made by the client application each time IM presence information is forwarded to the client application,
      initiate communication with the client application in response to the request from the client application,
      search the IM application for the IM presence information requested, and
      forward the IM presence information to the client application when the IM presence information is located, such that the IM presence information is integrated with the client application; and, otherwise when the IM presence information is not located, forwarding an indication that the IM presence information is not located to the client application; and
   an application program interface that provides the IM server with access to the client application rather than having to directly communicate with a client IM application.

9. A system of claim 8, wherein the IM server is further arranged to receive a request for a previously identified contact that is associated with the client application.

10. A system of claim 9, wherein the IM server is further arranged to search the buddy list associated with the IM application for the previously identified contact.

11. A system of claim 9, wherein the IM server is further arranged to search a contacts application for an entry corresponding to the previously identified contact, wherein the entry of the contacts application has a first parameter that matches a second parameter within an entry of a buddy list associated with the IM application.

12. A system of claim 8, wherein the IM server is further arranged to provide the client application with a unique identifier that uniquely identifies the client application.

13. A system of claim 8, wherein the IM server is further arranged to generate a message queue and providing the client application a copy of the queue, such that communication with the client application is synchronized.

14. A system of claim 8, wherein the IM server is further arranged to provide the IM presence information to the client application such that the client application publishes the IM presence information in a user interface associated with the client application.

15. A system for providing Instant Message (IM) presence information through a client application on a mobile device, comprising:
   receive a request from the client application for the IM presence information each time IM presence information or an indication that the IM presence information is not located is forwarded to the client application; wherein the client application is not configured as a client IM application;
   initiate communication with the client application in response to the request from the client application;
   search an IM application for the IM presence information requested;
   forward the IM presence information to the client application when the IM presence information is located, such that the IM presence information is integrated with the client application; and
   forwarding an indication that the IM presence information is not located to the client application when the IM presence information is not located.

16. The system of claim 15, wherein the application is further configured to receive a request for a previously identified contact that is associated with the client application.

17. The system of claim 16, wherein the application is further configured to search a buddy list associated with the IM application for the previously identified contact.

18. The system of claim 16, wherein the application is further configured to search a contacts application for an entry corresponding to the previously identified contact, wherein the entry of the contacts application has a first parameter that matches a second parameter within an entry of a buddy list associated with the IM application.

19. The system of claim 15, wherein the application is further configured to provide the client application with a unique identifier that uniquely identities the client application.

20. The system of claim 15, wherein the application is further configured to generate a message queue and providing the client application a copy of the queue, such that communication with the client application is synchronized.

21. The system of claim 15, wherein the application is further configured to provide the IM presence information to the client application such that the client application publishes the IM presence information in a user interface associated with the client application.

* * * * *

UNITED STATES PATENT AND TRADEMARK OFFICE
CERTIFICATE OF CORRECTION

PATENT NO.         : 7,317,928 B2
APPLICATION NO.    : 10/811232
DATED              : January 8, 2008
INVENTOR(S)        : David Edward Stewart et al.

Page 1 of 1

It is certified that error appears in the above-identified patent and that said Letters Patent is hereby corrected as shown below:

In column 9, line 18, in Claim 4, delete "marches" and insert -- matches --, therefor.

In column 10, line 54, in Claim 19, delete "identities" and insert -- identifies --, therefor.

Signed and Sealed this
Eighth Day of February, 2011

David J. Kappos
*Director of the United States Patent and Trademark Office*